United States Patent [19]
Traynor et al.

[11] Patent Number: 4,859,046
[45] Date of Patent: Aug. 22, 1989

[54] LANE VIEWER MIRROR APPARATUS FOR VEHICLES

[76] Inventors: Rodney P. Traynor, 620 Dexter, Denver, Colo. 80220; Albert F. Zeedick, 6279 S. Johnson Ct., Littleton, Colo. 80123

[21] Appl. No.: 196,569
[22] Filed: May 20, 1988
[51] Int. Cl.[4] ............................ B60R 1/06; B60R 1/08
[52] U.S. Cl. ............................ 350/627; 350/612; 350/625; 350/626
[58] Field of Search ............. 350/590, 612, 625, 626, 350/627

[56] References Cited

U.S. PATENT DOCUMENTS

| | | | |
|---|---|---|---|
| 2,890,539 | 6/1959 | Holt | 350/616 |
| 3,180,219 | 4/1965 | Ruiz et al. | 350/627 |
| 3,628,851 | 12/1971 | Robertson | 350/627 |
| 3,826,563 | 7/1974 | Davis | 350/627 |
| 4,245,894 | 1/1981 | Luchtenberg | 350/627 |
| 4,258,979 | 3/1981 | Mahin | 350/625 |
| 4,306,770 | 12/1981 | Marhauer | 350/627 |
| 4,331,382 | 5/1982 | Graff | 350/627 |

FOREIGN PATENT DOCUMENTS

| | | | |
|---|---|---|---|
| 2726311 | 4/1979 | Fed. Rep. of Germany | 350/627 |
| 2744409 | 4/1979 | Fed. Rep. of Germany | 350/627 |
| 2040843 | 9/1980 | United Kingdom | 350/627 |

Primary Examiner—Bruce Y. Arnold
Assistant Examiner—R. D. Shafer
Attorney, Agent, or Firm—Henderson & Sturm

[57] ABSTRACT

A rear view mirror apparatus for a vehicle having a housing adapted to be attached to one side of the vehicle. A mirror assembly is attached to the housing and includes a first planar mirror section having a reflective surface thereon for visually reflecting to the driver of the vehicle what is in the lane adjacent to the lane that such vehicle is in at a point several car lengths behind such vehicle. A second planar mirror section having a reflective surface thereon is provided for visually reflecting to the driver of the vehicle what is in the lane directly beside such vehicle, in the blind spot, such second planar mirror section being disposed at an angle with respect to the first planar mirror section. The second planar mirror section is fixed with respect to the first mirror section whereby movement of one mirror section results in a corresponding movement of the other mirror section. A black spacer is disposed between the reflective surfaces of the first and second planar mirror sections for defining a clear line of demarcation to the vehicle operator between what is being shown in each section whereby the user will not become confused, even for an instant.

4 Claims, 3 Drawing Sheets

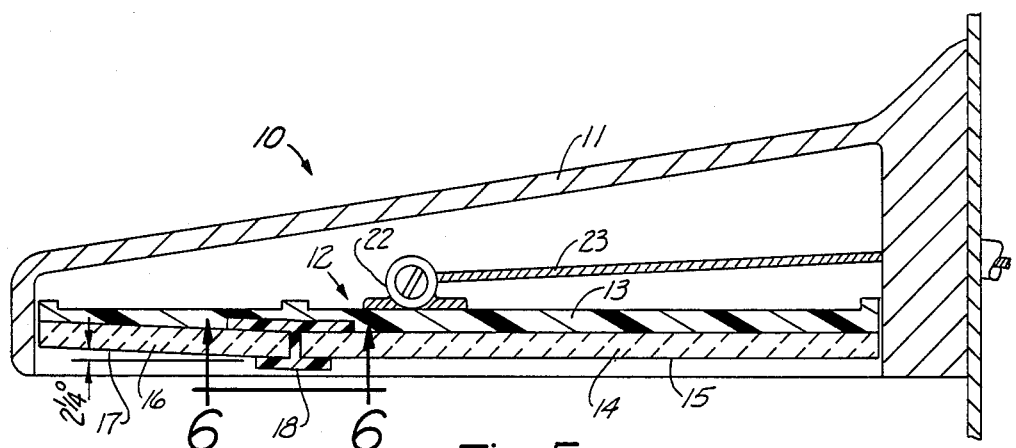
Fig. 5
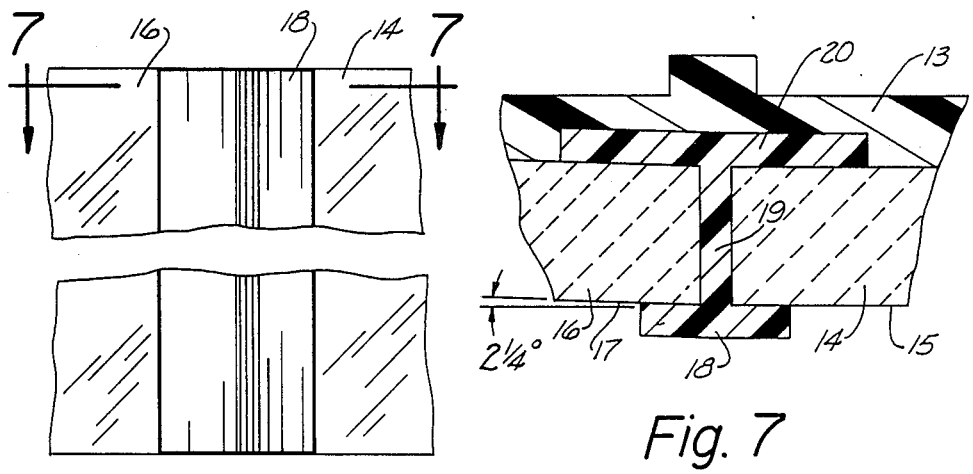
Fig. 6
Fig. 7
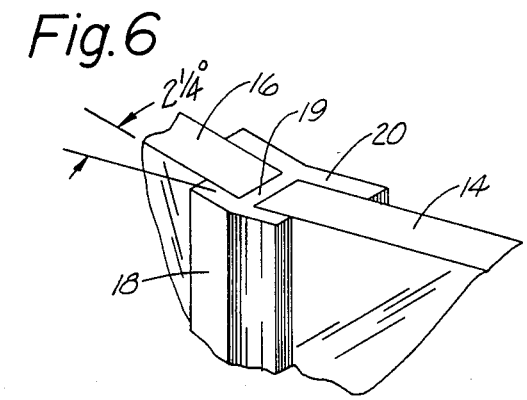
Fig. 8

LANE VIEWER MIRROR APPARATUS FOR VEHICLES

TECHNICAL FIELD

The present invention relates generally to a rear view mirror apparatus for vehicles and more particularly to such an apparatus which effectively eliminates the blind spot that a vehicle operator normally has of a second vehicle in the lane beside it and just before such second vehicle enters the peripheral vision of the vehicle operator

BACKGROUND OF THE INVENTION

Conventional rear view mirrors of the type which are attached to the side of a vehicle and having a single planar surface suffer from a major deficiency. Such conventional rear view mirrors typically are adjusted by a vehicle operator so that such mirror will indicate to the vehicle operator when another vehicle is approaching in the lane adjacent thereto. However, once the vehicle in the adjacent lane begins to overtake and overlap the lead vehicle, there is a "blind spot" just prior to the time that the trailing vehicle in the adjacent lane enters the peripheral vision of the driver in the lead vehicle wherein the conventional rear view mirror will not have an image of such trailing vehicle in the adjacent lane. This problem, it is speculated, has caused thousands of accidents wherein the driver of the lead vehicle has changed lanes into the path of the trailing vehicle because no image of the trailing vehicle appeared in the side mounted rear view mirror.

Because of the magnitude of the aforementioned problem, various side mounted rear view mirrors have been devised in an attempt to overcome it. For example, U.S. Pat. Nos. 3,628,851 to Robertson, 4,306,770 to Marhauer and 4,311,382 to Graff show contoured mirrors which will give the driver a view of not only the lane beside the driver at some distance behind the vehicle the driver is operating, but will also show a vehicle in the aforementioned blind spot. A problem with the contoured mirror concept as exemplified by the aforementioned three patents is that there is considerable distortion on the contoured portion of the mirror which will tend to confuse the driver using these structures. Furthermore, there is a blending of the images of what is in the adjacent lane a considerable distance back from the vehicle utilizing the mirror and the image of what may or may not be in the blind spot area. This further can cause confusion and it is well-known that confusion for even an instant can cause vehicular accidents.

U.S. Pat. No. 3,826,563 to Davis shows a rear view mirror apparatus which has one mirror above and one mirror below which are independently adjustable to give the vehicle operator a normal rear view perspective on the adjacent lane in one mirror and to show the blind spot area on the other mirror and overlapping what is shown in the first mirror. Because of the overlapping situation, some confusion by the user could result and furthermore there could be some confusion by the user as to which mirror is showing which area of the adjacent lane.

Another prior art structure has been the use of a convex mirror glued to a normal rear view mirror but while such a structure is useful to indicate that there may be a car in the blind spot area, it still leads to confusion because of all of the distortion associated with convex mirrors.

DISCLOSURE OF THE INVENTION

The present invention relates generally to a rear view mirror apparatus for a vehicle having a housing adapted to be attached to one side of the vehicle. A mirror assembly is attached to the housing and includes a first planar mirror section having a reflective surface thereon for visually reflecting to the driver of the vehicle what is in the lane adjacent to the lane that such vehicle is in, at a point several car lengths behind such vehicle. A second planar mirror section having a reflective surface thereon is provided for visually reflecting to the driver of the vehicle what is in the lane directly beside such vehicle, in the blind spot, such second planar mirror section being disposed at an angle with respect to the first planar mirror section. The second planar mirror section is fixed with respect to the first mirror section whereby movement of one mirror section results in a corresponding movement of the other mirror section. A black spacer is disposed between the reflective surfaces of the first and second planar mirror sections for defining a clear line of demarcation to the vehicle operator between what is being shown in each section whereby the user will not become confused, even for an instant.

An object of the present invention is to provide an improved rear view mirror apparatus for a vehicle.

Another object of the present invention is to eliminate the "blind spot" common in conventional rear view mirrors.

Another object of the present invention is to provide an improved rear view mirror of the aforementioned type which has two planar reflective surfaces divided by a opaque line of demarcation to prevent confusion by the user.

Other objects, advantages, and novel features of the present invention will become apparent from the following detailed description of the invention when considered in conjunction with the accompanying drawings.

BRIEF DESCRIPTION OF THE DRAWINGS

FIG. 5 is an enlarged cross-sectional view taken along line 5—5 of FIG. 4;

FIG. 6 is an enlarged partial cross-sectional view taken along line 6—6 of FIG. 5;

FIG. 7 is an enlarged partial cross-sectional view take along 7—7 of FIG. 6; and FIG. 8 is a partial perspective view of the top portion of the present invention showing how the outer mirror is disposed two and one-fourth degrees (2¼°) from the inner mirror section.

BEST MODE FOR CARRYING OUT THE INVENTION

Figure 1:
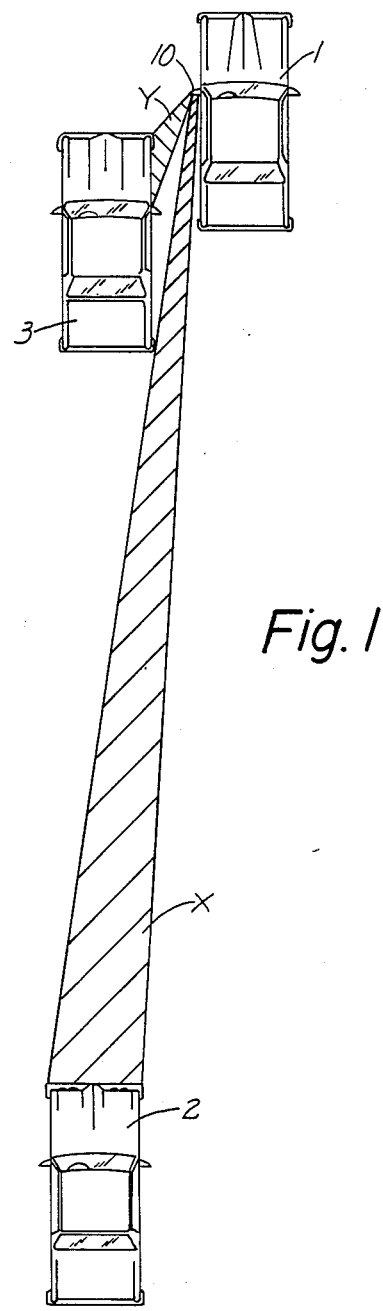
FIG. 1 is a top plan view showing a lead vehicle having a rear view mirror apparatus of the type shown in FIGS. 2-8 attached thereto and showing the field of vision of two separate planar reflective surfaces thereon, one which gives a field of view "X" and the other which shows a field of view "Y"
Figure 4:
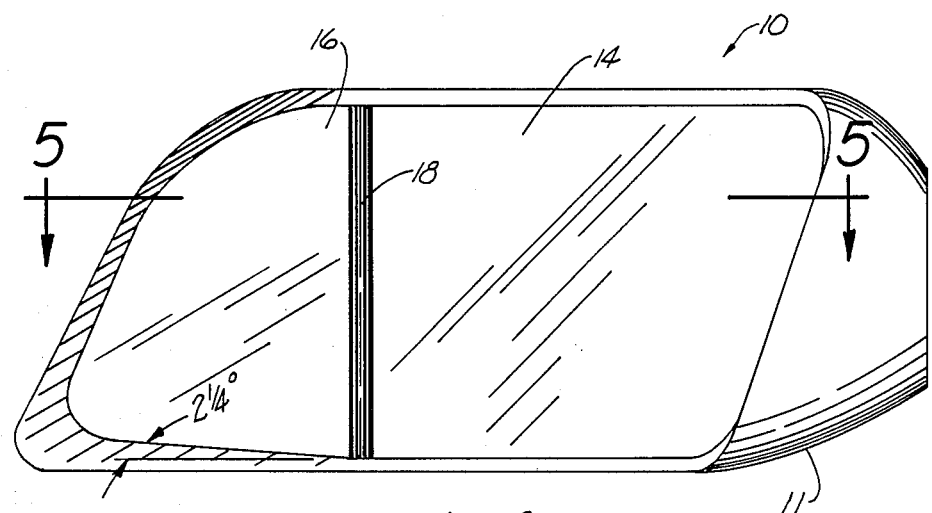
FIG. 4 is a rear view of a preferred embodiment of the present invention shown in FIGS. 2 and 3.

Referring now to the drawings wherein like reference numerals designate identical or corresponding parts throughout the several views, FIG. 1 shows a vehicle (1) having a rear view mirror apparatus (10) attached to one side thereof which gives a first field of view "X" showing an automobile (2) several lengths behind the automobile (1) in the lane adjacent to the automobile (1). Another portion of the rear view mirror apparatus (10) shows a third vehicle (3) along field of view "Y" which would normally represent the blind spot of the driver of vehicle (1) when using a conventional rear view mirror.

Referring to FIGS. 2-8, it is noted that the rear view mirror (10) includes a housing (11) which is rigidly attached to the vehicle (1). A mirror assembly (12) is disposed inside of the housing (11) and has a first plastic or aluminum member (13) with a first planar mirror (14) rigidly attached thereto. This mirror (14) has a planar reflective surface (15) thereon.

A second planar mirror (16) has a planar reflective surface (17) thereon and is held in place with respect to the first mirror (14) by being bonded to one end of the member (13) just as the mirror (14) is bonded to the member (13) by adhesive or the like. However, the planar surface (17) is disposed at an angle of two and one-fourth degrees (2¼°) with respect to the planar surface of the mirror (15) as can readily be seen in FIG. 5. This angle has been found to be optimum although it has been found that this angle can vary between one degrees (1°) and four degrees (4°) and still function adequately.

A black plastic spacer (18) separates the mirror sections (14 and 16) and includes a strip (20) behind the adjacent edges of the mirrors (14 and 16), a strip of plastic (19) between the mirrors (14 and 16) and, most importantly, a strip (18) in front of and dividing the mirrors (14 and 16) so that there is no blending between the mirror section (14) and the mirror section (16). This black dividing plastic member (18) forms a line of demarcation between the two mirrors (14 and 16) so that there cannot be confusion for even an instant as to which image in each mirror corresponds to which area "X" and "Y" as shown in FIG. 1.

A conventional pivotal mounting member (22) is attached to the housing (11) as can be seen in FIG. 5 and a cable (23) leading to the interior of the vehicle (1) is used in a conventional fashion to manipulate the position of the integral mirrors (14 and 16) with respect to the housing (11). This adjusting structure (22 and 23) operates just as in a conventional rear view mirror and consequently s not shown in complete detail since it is well known to those skilled in the art how to adjust mirrors.

Figure 2:
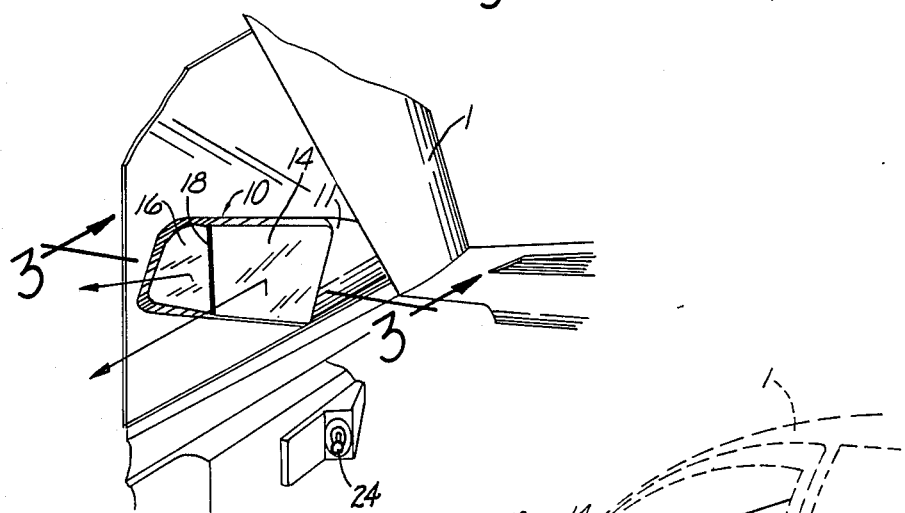
FIG. 2 is a perspective view of a preferred embodiment of the present invention shown from the perspective of a user while driving a vehicle, from inside the vehicle.
Figure 3:
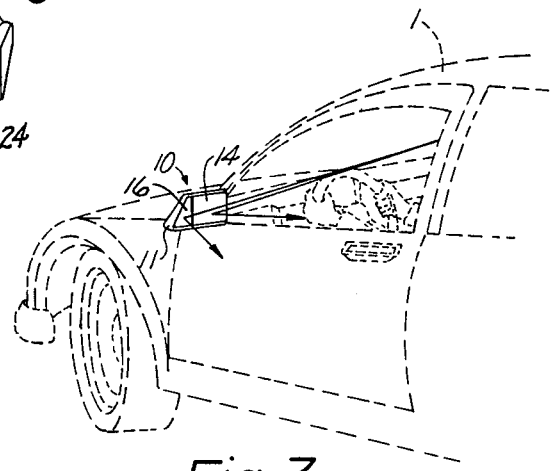
FIG. 3 is a perspective view of a preferred embodiment of the invention shown from the outside of the vehicle and showing the vehicle and the vehicle operator in dashed lines.

In operation, the lever (24), shown in FIG. 2, would be utilized to adjust the mirror (14) to cover the area "X" as shown in FIG. 1 as would be the case in a conventional rear view mirror situation. When this is done, the mirror (16), being integral with the mirror (14) by virtue of the connecting structure (13) and (18-20), will cause the mirror (18) to automatically adjust to cover the area "Y", shown in FIG. 1, which is generally spoken of as the "blind spot". There will be no need to independently adjust the position of the mirror (16); and, in fact, it cannot be independently adjusted with respect to the mirror (14) because it is preadjusted to cover the blind spot. It will be understood of course that if a taller or shorter vehicle operator is using the automobile (1), then the lever (24) would probably need to be adjusted to accommodate a difference in height or perhaps even from one operator a difference from side to side depending upon where they sit on the seat with respect to the steering wheel.

Once the mirrors (14 and 16) are adjusted to show the areas "X" and "Y", as shown in FIG. 1, the operator of the automobile (1) has two distinct areas to view with no blending of the two. The operator of the automobile will always know that the image in the mirror (16) is always in the blind spot and the image in the mirror (14) always represents a vehicle farther back behind such operator in the adjacent lane, as represented by the automobile (2) in FIG. 1. Because of the opaque black strip (18) which separates the two mirrors (14 and 16) by at least one-quarter of an inch, there can never be confusion because nothing will be reflected in the transition area of opaque black strip (18).

Accordingly, it will be appreciated that the preferred embodiment (10) disclosed herein does indeed accomplish the aforementioned objects. For example, the apparatus (10) could be attached to the right side of the vehicle (1) instead of on the left side of the vehicle (1) or there could be an apparatus (10) connected to both sides of the vehicle (1) and still be covered by the scope of the claims. Obviously many modifications and variations of the present invention are possible in light of the above teachings. It is therefore to be understood that, within the scope of the appended claims, the invention may be practiced otherwise that as specifically described.

We claim:

1. A rear view mirror for a vehicle, said rear view mirror apparatus comprising:

a housing rigidly attached to one side of a vehicle, said housing having a cavity formed therein;

a mirror assembly disposed in the cavity of said housing and adjustably attached to said housing, said mirror assembly comprising:

a first planar mirror section means having an outside edge away from the vehicle and having a reflective surface thereon for visually reflecting to the driver of the vehicle what is in the lane adjacent to the lane the vehicle is in at a point several car lengths behind said vehicle;

a second planar mirror section means having an inside edge toward the vehicle and having a reflective surface thereon for visually reflecting to the driver of the vehicle what is in the lane directly beside said vehicle, said second planar mirror section being disposed at an angle of more than one degree and less than four degrees with respect to said first planar mirror section means;

means for holding said second planar mirror section fixed with respect to said first mirror section, whereby movement of one mirror section means results in a corresponding movement of the other mirror section means, said holding means comprising an aluminum backing plate with both of said first and second planar mirror section means bonded thereto, said backing plate having a groove therein; and a black opaque spacer means disposed between the reflective surfaces of said first and second planar mirror section means for defining a clear line of demarcation to the vehicle operator between what is being shown in the first planar mirror section means that represents what is in the adjacent lane at a point several vehicle lengths back from said vehicle, and what is being shown in the second planar mirror section that represents that is in said adjacent lane directly beside said vehicle, said opaque spacer means also extending in front of and in back of said first and second planar mirror section means, a portion of a back part of said opaque spacer means being disposed in the groove of said backing plate.

2. The mirror apparatus of claim 1 wherein said angle is two and one-fourth degrees (2°).

3. The mirror apparatus of claim 1 wherein said second planar mirror section is disposed farther from said vehicle than is said first planar mirror section.

4. The mirror apparatus of claim 1 wherein the portion of said black opaque spacer means which is in front of said first and second planar mirror section means is at least twice as wide as the distance between the inside edge of the second planar mirror section and the outside edge of the first planar mirror section of said first and second planar mirror section means.

* * * * *